J. J. EAGAN.
VALVE SPRING COMPRESSOR.
APPLICATION FILED NOV. 13, 1914.

1,138,462.

Patented May 4, 1915.

WITNESSES
H. J. Walker

INVENTOR
John J. Eagan
BY
ATTORNEYS

UNITED STATES PATENT OFFICE.

JOHN JOSEPH EAGAN, OF NEW YORK, N. Y.

VALVE-SPRING COMPRESSOR.

1,138,462.　　　　Specification of Letters Patent.　　Patented May 4, 1915.

Application filed November 13, 1914. Serial No. 871,909.

*To all whom it may concern:*

Be it known that I, JOHN J. EAGAN, a citizen of the United States, and a resident of the city of New York, borough of Brooklyn, in the county of Kings and State of New York, have invented a new and Improved Valve-Spring Compressor, of which the following is a full, clear, and exact description.

My invention relates to devices for facilitating the removal of valves from the valve casings of internal combustion engines, and is more particularly designed to be used in connection with the Ford engine.

An object of the invention is to provide a simple, convenient and inexpensive valve spring compressor which can be easily and quickly applied, whether to place the valve in position or to remove the same from the valve casing.

With the above and other objects in view, the nature of which will more fully appear as the description proceeds, the invention consists in the novel construction, combination and arrangement of parts as herein fully described, illustrated and claimed.

Figure 1:
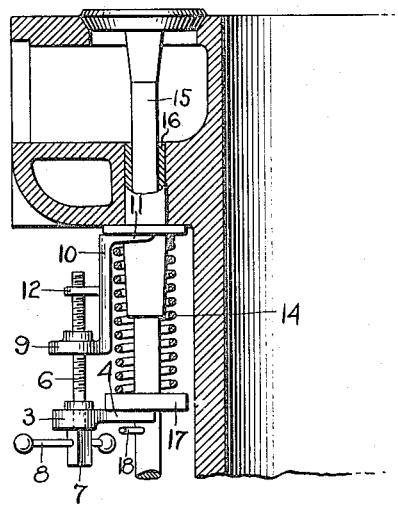
Figure 2:
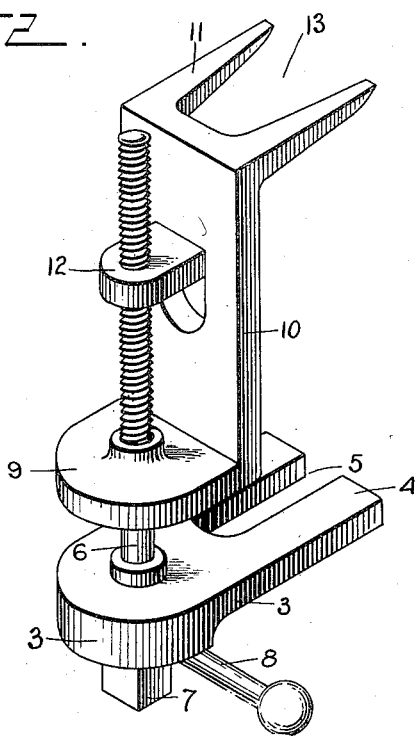

In the accompanying drawings, forming part of the application, similar characters of reference indicate coresponding parts in all the views, and Figure 1 is a section of a Ford engine showing my device applied to the valve spring; and Fig. 2 is a perspective view of an embodiment of my invention.

In most engines, and particularly in the Ford, the valves located adjacent the intake manifold are not easily accessible for tools for compressing the spring by engaging the top of the valve casing; and to obviate this defect I have provided a small tool consisting of two relatively movable members and means for moving said members relative to one another.

Referring to the drawings, 3 represents the head which has a laterally extending flange 4 provided with an end slot 5. It may be said that the head 3 has a bifurcated lateral flange. Mounted to turn in the head 3, but prevented from moving longitudinally, is a screw 6, the head 7 of which is provided with a handle 8 mounted to slide in the head transversely of the screw. The head 7 is preferably of angular cross section, so that the same, when necessary, may be engaged by a wrench. The threaded part of the screw is in threaded engagement with a lateral flange 9 of the relatively movable member 10. The said member is also provided with a second lateral flange 11 at the other end thereof disposed and directed oppositely to the flange 9. The relatively movable member 10 is also provided with a projection 12 in alinement with the flange 9 and adapted to be engaged by the screw 6 for which the same forms a bearing. This projection may be stamped out of the material from which the member 10 is made, or formed thereon in any other suitable way. The lateral flange 11 of the member 10 is provided with a slot 13 to make the said flange bifurcated. This bifurcated flange has its extremity beveled so as to easily fit between the coils of a valve spring 14.

As shown in Fig. 1, the valve 11 is made to engage the spring 14 adjacent the flange of the valve bushing 16; while the flange 4 of the head 3 is made to engage the washer 17 which normally covers the pin 18. By turning the screw 6 by means of the handle 8, the members 10 and 3 are moved toward each other, causing the compression of the spring. Before my device is applied to a valve 15 the valve is turned so that a pin 18 will be in alinement with the slot 5 of the head 3 when the same is made to engage the valve. The flange 4 engages a washer 17 and causes the same to move on the valve 15 when the handle 8 of the screw 6 is turned to move the head and the member 10 toward each other. The washer 17 must be displaced on the valve 15 through a quarter of an inch to expose the pin 18, which can then be extracted and thus permit the extraction of the valve 15, while the washer 17 and the spring 14 will be maintained in compression between the head 3 and the member 10 until the valve is restored to its original position, when the head and the member 10 can be actuated by the screw 6, so that they release the spring and set the washer 17 over the pin 18 replaced in the valve. It will be noted that since the displacement of the two members is very small, the threaded part of the screw does not necessarily need to extend through the entire length of the screw when the projection 12 of the member 10 serves only as a guide. Attention may also be called to the fact that the flange 11 of the member 10 does not need to engage the spring adjacent the flange of the valve bushing 16, but it may engage any of the coils of the spring 14 between the end engaging the bushing 16 and the washer. By compressing this portion which is engaged between the head 3 and the member 10 the same result will be obtained as previously described.

From the foregoing description, taken in connection with the accompanying drawings, the advantage of the construction and operation of the device shown will be readily understood by those skilled in the art to which the invention pertains, and while I have described the principle of operation, together with the device which I now consider to be the best embodiment thereof, I desire to have it understood that the device shown is merely illustrative and that such changes may be made as are within the scope of the appended claim.

Having thus described my invention, I claim as new and desire to secure by Letters Patent:—

In a device of the class described, a head having a lateral bifurcated flange, a member having at the ends thereof oppositely disposed lateral flanges, a screw in said head mounted to turn therein, but prevented from longitudinal movement thereof, said screw being in threaded engagement with one of the flanges of said member, the other of said flanges having a slot, and a projection on said member in alinement with the flange engaged by the screw, said projection forming a bearing for said screw.

In witness whereof I have signed my name to this specification in the presence of two subscribing witnesses.

JOHN JOSEPH EAGAN.

Witnesses:
PHILIP D. ROLLHAUS,
A. H. DAVIS.